United States Patent [19]
Maegawa et al.

[11] Patent Number: 5,247,411
[45] Date of Patent: Sep. 21, 1993

[54] MULTIPLE-CHANNEL MAGNETIC HEAD HAVING PLURAL MAGNETIC HEAD TIPS MOUNTED ON A SINGLE HEAD BASE

[75] Inventors: Takaaki Maegawa; Yoshihiko Morioka, both of Neyagawa; Masaru Higashionji; Akio Kuroe, both of Katano, all of Japan

[73] Assignee: Matsushita Electric Industrial Co., Ltd., Osaka, Japan

[21] Appl. No.: 787,613

[22] Filed: Nov. 4, 1991

[30] Foreign Application Priority Data
Nov. 2, 1990 [JP] Japan ................. 2-297713

[51] Int. Cl.⁵ .................. G11B 5/48; G11B 5/10
[52] U.S. Cl. .................. 360/104; 360/84; 360/128
[58] Field of Search ........... 360/104, 109, 119, 121, 360/125, 84–85

[56] References Cited
U.S. PATENT DOCUMENTS

| | | | |
|---|---|---|---|
| 4,672,489 | 6/1987 | Wada et al. | 360/104 |
| 4,816,950 | 3/1989 | Heinz et al. | 360/84 X |
| 5,075,809 | 12/1991 | Heinz et al. | 360/128 |

FOREIGN PATENT DOCUMENTS
3-44808  2/1991  Japan .

Primary Examiner—John H. Wolff
Attorney, Agent, or Firm—Wenderoth, Lind & Ponack

[57] ABSTRACT

In the magnetic recording characteristics of recording apparatus, when there are three or more magnetic tips disposed on one head base, the extension lines in the depth direction of the head tips pass through the central line of the cylinder. The both outermost head tips on the head base disposed in one window of the cylinder possess head gaps as dummy head, but do not have the function of magnetic recording characteristics of recording, reproducing and erasing. In the disclosed multiple magnetic head, the materials of the head tips on one head base including the dummy head are the same.

4 Claims, 5 Drawing Sheets

FIG. 3
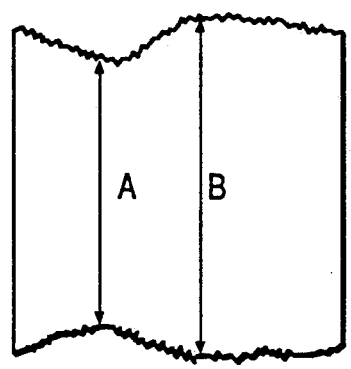
FIG. 4(a)
FIG. 4(b)
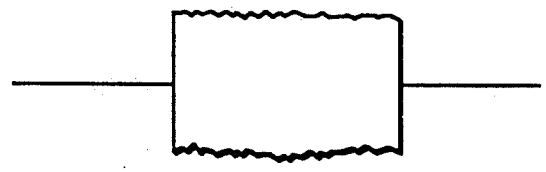
FIG. 4(c)
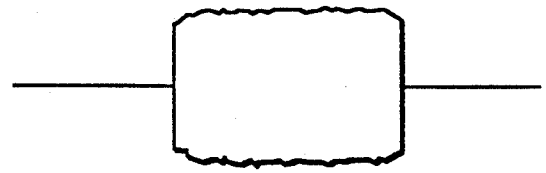
FIG. 4(d)

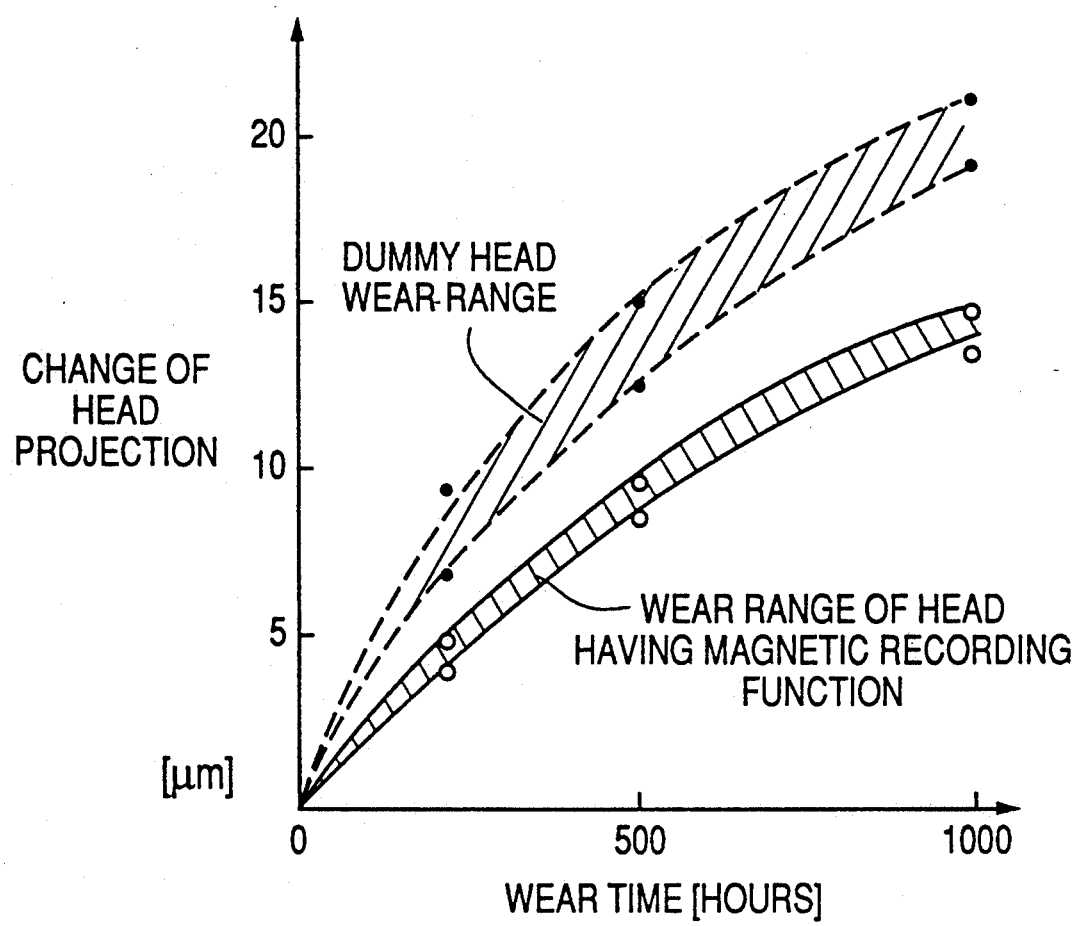

MULTIPLE-CHANNEL MAGNETIC HEAD HAVING PLURAL MAGNETIC HEAD TIPS MOUNTED ON A SINGLE HEAD BASE

BACKGROUND OF THE INVENTION

1. Field of the Invention

The present invention relates to a multiple channel, magnetic head of a magnetic recording apparatus which is used, for example, in a video tape recorder (VTR).

2. Description of the Prior Art

In a conventional VTR, the magnetic head is fixed so as to project from a cylinder on which a magnetic tape is wound by a specific angle (supposing the cylinder radius of the VHS deck to be 31 mm) by a specific amount. This conventional magnetic head is explained below while referring to the drawing. FIGS. 2(a) and (b) are an explanatory drawings of a conventional magnetic head. Two head tips 2 are disposed on one head base 3. In the conventional head, for the ease of manufacture, the head tips 2 are disposed in parallel at a specific gap. Therefore, if the extension line 4 of one head depth 1 passes through the central point 5 of the cylinder, the extension line 4 of the other head depth 1 will not pass through the central point 5 of the cylinder. That is, the extension lines 4 of two head depths 1 on a same head base 3 never both pass through the central point 5 of the cylinder. In this case, further, by simultaneously machining the two head tips 2 on one head base on the entire surface, the contact between the head and tape is favorably maintained, and satisfactory magnetic recording characteristics are obtained. In the recent VTR system, however, the picture quality of the recorded has advanced, and it is necessary to record an enormous quantity of information signals in a wide band. Accordingly, a multi-channel recording technique is employed in which the signals are divided into multiple channels and recorded using a so-called multiple channel recording head for recording and reproducing a plurality of heads simultaneously. In one of its practical examples, a plurality of head tips 2 are placed on one head base 3 and disposed to align in the horizontal direction. The magnetic head composition, consequently, has a shape which is elongated in the sliding direction. However, in such a constitution not all of the tips establish favorable contact with the tape, and the obtained reproduction envelope outputs are not uniform. In other words, in the existing multiple channel magnetic head configuration, the contact position of the head and tape is not a symmetrical contact centered on the gap of the head tips on one head base 3, and a favorable contact of the tape and head is not obtained.

Thus, in the multiple channel magnetic head of the conventional head configuration, since the shape thereof is elongated in the sliding direction, it is difficult to achieve contact of the tape on the gap on all of plural head tips and to wear uniformly in the direction of head depth.

SUMMARY OF THE INVENTION

It is hence a primary object of the invention to realize an extremely stable recording and reproduction by optimum contact of a recording medium on the gap of each magnetic head tip even if three or more magnetic head tips are disposed on one head base.

To achieve the above object, the invention presents a multiple magnetic head disposed on a rotary cylinder, wherein N head tips, where N is an integer of 3 or more, having a tape sliding surface preliminarily formed in a curvature on a single head base have extension lines of the individual gap depths passing through a center (rotational center) point of the cylinder. A magnetic head in a constitution not having electro-magnetic conversion functions of recording, reproducing and erasing, in the same shape as the head tips may be disposed at each outermost side on both sides of the head base disposed in one window of the cylinder.

BRIEF DESCRIPTION OF THE DRAWINGS

FIGS. 1(a) and (b) show the structure of a magnetic head in an embodiment of the invention, in which FIG. 1(a) is a view from the head sliding surface.

FIG. 3 is a graph for defining the rate of flatness of an envelope.

FIGS. 4(a) to (d) show the flatness of envelope of individual multiple magnetic head tips respectively from the inlet to the outlet of the tape.

FIG. 5 is a graph for showing the changes of the wear time and head projection amount.

DESCRIPTION OF THE PREFERRED EMBODIMENTS

A multiple channel magnetic head in an embodiment of the invention is described below while referring to the accompanying drawings.

Embodiment 1

Figure 1A:
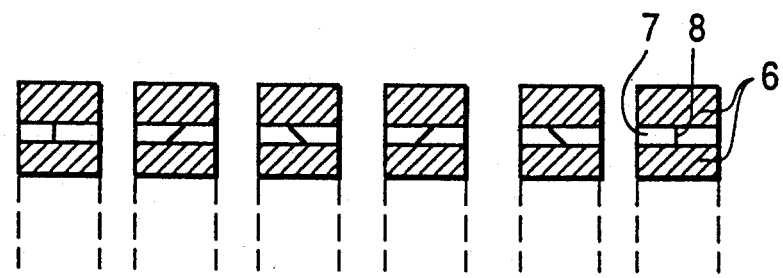
Figure 1B:
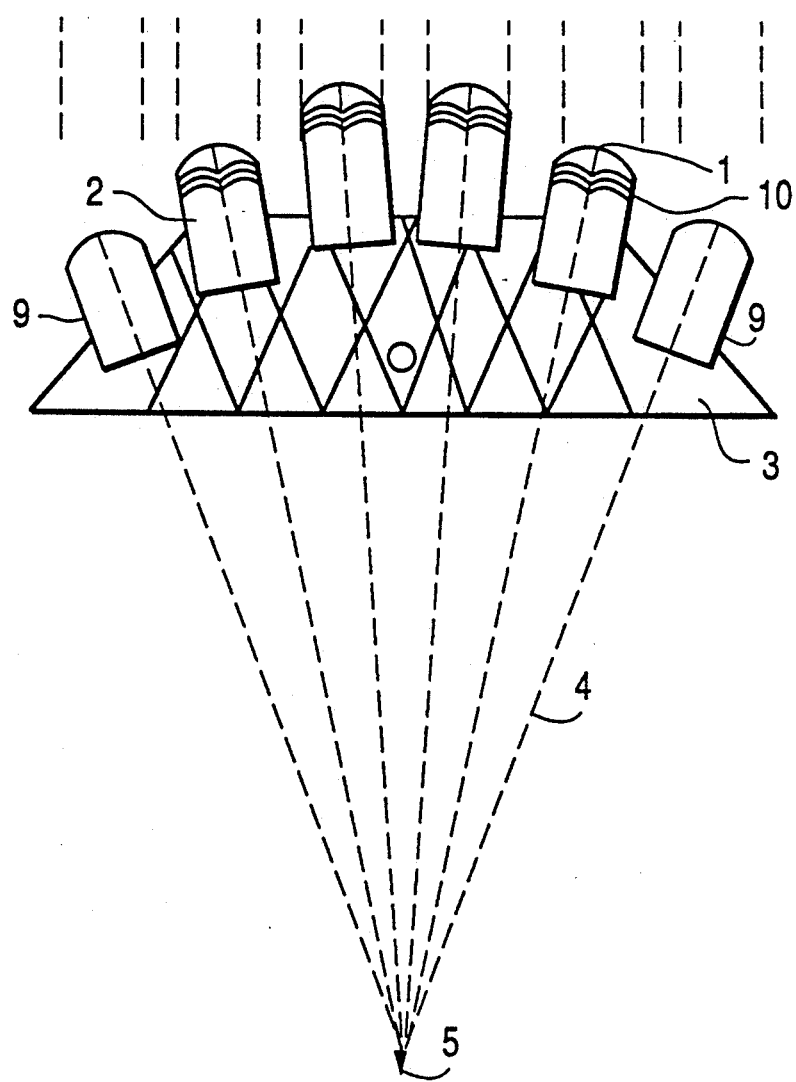
FIG. 1(b) is a mounting view of each head tip on the head base.
Figure 2A:
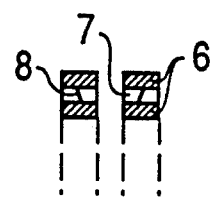
FIG. 2(a) is a view from the sliding surface of a conventional magnetic head.
Figure 2B:
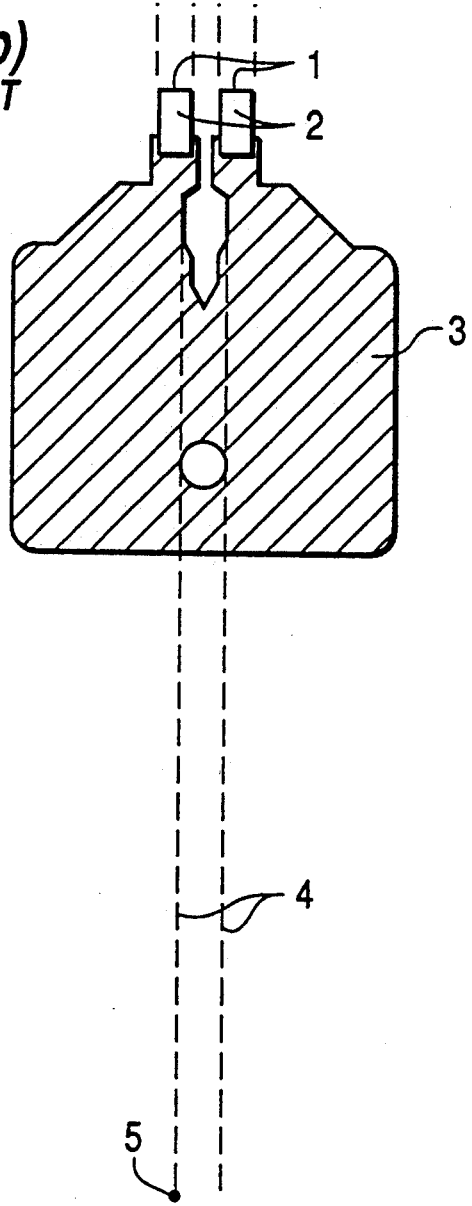
FIG. 2(b) shows the shape of the conventional magnetic head.
Figure 6A:
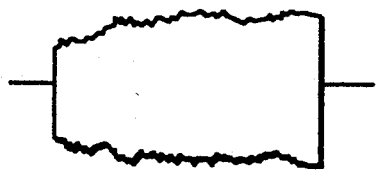
FIGS. 6(a) to (d) show the flatness of envelopes of the multiple channel magnetic head when the track substrate material of the dummy head is the same as the core width material, and in particular, the flatness of the envelopes of the individual multiple channel magnetic head tips respectively from the inlet to the outlet of the tape.
Figure 6B:
Figure 6C:
Figure 6D:
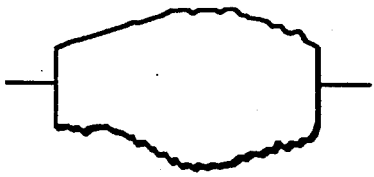

FIGS. 1(a) and (b) shows the constitution of a multiple channel magnetic head of the invention. This embodiment relates to a multiple channel magnetic head having four head tips 2 disposed on one head base mounted on a rotary cylinder in which the length of the recording medium contact surface of one head tip 2 is 600 $\mu$m, and the head gap 8 of adjacent head tips 2 is 1 mm. The tape sliding surface of the four magnetic head tips 2 is installed so that each extension line 4 in the depthwise direction of the head gap depth 1 processed in a curvature preliminarily passes through the central point 5 of a rotary cylinder. The multiple channel magnetic head is mounted on a rotary cylinder having a diameter of 62 mm used in the present VHS. The peak in the sliding direction of the four magnetic head tips 2 is matched with the magnetic gap position, and the peak is formed in 31.04 mm with the radius of curvature of the arc matched with the cylinder radius, and the projection of the multiple magnetic channel head from the cylinder is set at 40 $\mu$m. Finally, the head gap 8 and the peak of the head tip 2 are matched, and the shape of linking the head gap 8 is the shape of summing up the radius of the mounting cylinder and the head projection amount, which is 31.04 mm. The radius of curvature of the front shape of the recording medium side of each head tip is about 7 mm, which is smaller than the radius of the head mounting cylinder.

In a VTR having such a multiple channel magnetic head, a magnetic tape is used to record and reproduce information. In this case, a stable and optimum contact state of the magnetic tape with the individual multiple magnetic heads 2 is judged by the flatness of the envelope when reproducing the output. When this flatness is favorable and a large output is obtained, it is judged that the contact of the head and tape is adequate.

In experiments carried out using the above head constitution, all four head tips 2 had a stable contact with the tape, and the shape of the envelope from the inlet to the outlet of the tape had an excellent flatness as shown in FIGS. 4(a) to (d). In all four heads, the flatness was 90% or more. There was almost no difference among them, and the contact scar was found to be a sliding scar of 300 μm each at the tape inlet side and outlet side, centered on the head gap 8.

Here, the flatness of the envelope relates to the rate of the maximum value and minimum value of the output level from the start of contact with the magnetic tape till leaving in one revolution of the individual head tips on the rotary cylinder. In particular, flatness= $A/B \times 100[\%]$ as shown in FIG. 3.

Embodiment 2

Removing both outermost head tips in Embodiment 1, in the initial time of using the head, all multiple channel magnetic head tips 2 have a stable contact with the tape, but in about 1000 hours of use of head tips 2, the head wear occurs, and when the projection from the cylinder is reduced by about 12 μm, the individual head tips are not worn uniformly because of the difference in the contact pressure between the multiple magnetic head tips 2 and the tape. More specifically, two central heads are worn simultaneously, but the outer head tips 2 are worn more excessively on the outer side due to the relation with the tape contact pressure, and the tape no longer contacts optimally with the gap 8 on both outer head tips 2, and the flatness of the envelope cannot be maintained over 90% and sometimes falls below 50%. That is, the worn state of both outer head tips 2 becomes no longer symmetrical about the gap 8, and the magnetic tape is likely to be lifted, the spacing loss increases, the envelope becomes poor, which caused the output to lower.

Accordingly, considering the life of the head tip 2, when the both outer head tips 2 projecting from one window of the cylinder are furnished with one having neither function of recording, reproducing or erasing nor a winding coil 10 (hereinafter called a dummy head 9), the change of the projection of the head actually used in recording and reproducing was reduced as shown in FIG. 5, and the outputs of all head tips 2 were found to have a uniform envelope. Further, the life of the head depends on the presence or the absence of the dummy head 9 with respect to wear time, and the wear amount is 30% smaller in the presence of the dummy head 9 and the envelope flatness of each head tips 2 can be obtained exceeding 90% as shown in FIG. 4, and the head life can be extended without lowering the output.

In this case, too, the wear of head tips 2 occurs mainly on the gap 8 of the head chips 2, and by suppressing the differential wear and eliminating differences in the wear amount in the head tips 2, an optimum contact with the tape may be achieved. When the material of the core substrate 6 of the dummy head 9 and the material of the magnetic material 7 are not the same as the material of the magnetic head tip having the winding coil 10, the head wear of the dummy head 9 is different from the wear of the other head tips 2, and as compared with the dummy head 9 made of same material, the flatness of envelope is lowered to 70% after running 100 hours as shown in FIG. 6.

This phenomenon is particularly outstanding in the magnetic head adjacent to the dummy head 9. It is hence desired that the material of the core substrate 6 of the dummy head 9, and the material of the magnetic material 7 may be the same as the material of the magnetic head tip 2 having the winding coil 10.

In this case, if the multiple channel magnetic head also refers to the ferrite head, sendust head, amorphous head, and other laminated-type heads and metal-in-gap heads of magnetic heads, it may be applied not only to the VTR but also to audio appliances such as tape recorder. It is also applicable to thin film multiple heads, aside from bulk heads.

Herein, the multiple channel magnetic head has been explained in a form of four head tips or six head tips mounted on a single head base, but the number of head tips is not limited, whether in an odd number or in an even number. Similarly, as an example, the contact surface length of the recording medium using the head tips has been defined as 600 μm, but this length can be longer or shorter than 600 μm.

Also, the adjacent gap can be extended from 1 mm to reduce crosstalk, for example to about 3 mm or 4 mm. That is, without being influenced by the length of the adjacent tip or the tip gap, a stable contact with the recording medium is obtained in this constitution.

What is claimed is:

1. A multiple-channel magnetic head disposed on a rotary cylinder, comprising:
   a single head base mounted on said rotary cylinder; and
   N magnetic head tips, N being an integer of at least 3, disposed on said single head base such that an extension line extending centrally along a gap depth on each of said N magnetic tips passes through a center point of said rotary cylinder.

2. A multiple-channel magnetic head as recited in claim 1,
   wherein said N magnetic head tips include first and second outermost magnetic head tips and at least one other magnetic head tip located between said first and second outermost magnetic head tips, and
   wherein each of said at least one other magnetic head tip comprises a tip part made of a magnetic material and having a head gap, a core substrate for supporting said tip part, and a winding coil wound on said core substrate, and
   wherein each of said first and second outermost magnetic head tips comprises a tip part made of a magnetic material and having a head gap, and a core substrate for supporting said tip part, and is devoid of a winding coil wound on said core substrate.

3. A multiple-channel magnetic head as recited in claim 2, wherein the magnetic material of said tip part and a material of said core substrate of each of said at least one other magnetic head tip are respectively the same as the magnetic material of said tip part and a material of said core substrate of each of said first and second outermost magnetic head tips.

4. A multiple-channel magnetic head according to claim 1, wherein each of said N magnetic head tips has a front surface for facing a recording medium, said front surface forming an arc shape having a radius of curvature which is smaller than a radius of said rotary cylinder, and wherein a position of the gap of each head tip coincides with a peak of said front surface viewed in a head moving direction and projected by a specified amount from a periphery of said rotary cylinder in a radius direction of said rotary cylinder.

* * * * *